US012570503B2

(12) United States Patent
    Tanov

(10) Patent No.: US 12,570,503 B2
(45) Date of Patent: Mar. 10, 2026

(54) HANDRAIL AND METHOD OF MANUFACTURING A HANDRAIL

(71) Applicant: Semperit AG Holding, Vienna (AT)

(72) Inventor: Slavi Tanov, Wiener Neustadt (AT)

(73) Assignee: Semperit AG Holding, Vienna (AT)

( * ) Notice: Subject to any disclaimer, the term of this patent is extended or adjusted under 35 U.S.C. 154(b) by 80 days.

(21) Appl. No.: 18/572,501

(22) PCT Filed: Jun. 21, 2022

(86) PCT No.: PCT/EP2022/066810
    § 371 (c)(1),
    (2) Date: Dec. 20, 2023

(87) PCT Pub. No.: WO2022/268766
    PCT Pub. Date: Dec. 29, 2022

(65) Prior Publication Data
    US 2024/0279029 A1     Aug. 22, 2024

(30) Foreign Application Priority Data
    Jun. 21, 2021     (DE) ..................... 10 2021 116 000.6

(51) Int. Cl.
    *B66B 23/24*     (2006.01)
    *B32B 1/00*      (2024.01)
    *B32B 3/08*      (2006.01)
    *B32B 7/12*      (2006.01)
    *B32B 27/08*     (2006.01)
    *B32B 27/32*     (2006.01)
    *B32B 27/40*     (2006.01)

(52) U.S. Cl.
    CPC ................ *B66B 23/24* (2013.01); *B32B 1/00* (2013.01); *B32B 3/08* (2013.01); *B32B 7/12* (2013.01);
    (Continued)

(58) Field of Classification Search
    CPC .. B66B 23/24; B32B 1/00; B32B 3/08; B32B 7/12; B32B 27/08; B32B 27/32;
    (Continued)

(56) References Cited

U.S. PATENT DOCUMENTS 3,463,290 A * 8/1969 Tajima .................... B66B 23/24
                                                        198/337
5,160,009 A * 11/1992 Iyoda ...................... B66B 23/24
                                                        198/337
(Continued)

FOREIGN PATENT DOCUMENTS

CN        103991205 A    4/2017
DE         3921888 C2    6/1993
          (Continued)

OTHER PUBLICATIONS

European Patent Office; International Search Report; Nov. 2, 2023; entire document.

*Primary Examiner* — Mark A Deuble
(74) *Attorney, Agent, or Firm* — Price Heneveld LLP

(57)     ABSTRACT

A handrail mountable on a guide element for moving walkways, escalators or the like, includes a substructure arranged or configured to be arranged on the guide element, and a ceiling structure that includes at least one adhesive layer and a top layer, wherein the handrail has a substantially constant cross-section along a profile direction, wherein the materials of the top layer and the adhesive layer differ from one another, and wherein the ceiling structure with the adhesive layer is attached to the substructure.

17 Claims, 3 Drawing Sheets

(52) U.S. Cl.
CPC .............. *B32B 27/08* (2013.01); *B32B 27/32*
(2013.01); *B32B 27/322* (2013.01); *B32B*
*27/40* (2013.01); *B32B 2307/7376* (2023.05);
*B32B 2457/00* (2013.01)

(58) Field of Classification Search
CPC .................. B32B 27/322; B32B 27/40; B32B
2307/7376; B32B 2457/00
See application file for complete search history.

(56) References Cited

U.S. PATENT DOCUMENTS

| | | | | | |
|---|---|---|---|---|---|
| 5,255,772 | A | * | 10/1993 | Ball | ........................ B66B 23/24 |
| | | | | | 198/337 |
| 6,673,431 | B1 | * | 1/2004 | Ledzinski | ............... B66B 23/24 |
| | | | | | 428/292.1 |
| 6,761,259 | B1 | | 7/2004 | Onodera et al. | |
| 7,641,038 | B2 | * | 1/2010 | El-Wardany | ............ B66B 23/24 |
| | | | | | 198/335 |
| 8,721,949 | B2 | * | 5/2014 | Wesson | .................. B66B 23/24 |
| | | | | | 198/336 |
| 11,827,492 | B2 | * | 11/2023 | Nakamura | .......... B29C 65/5042 |
| 11,975,943 | B2 | * | 5/2024 | Guo | ........................ B32B 27/08 |
| 2015/0283750 | A1 | | 10/2015 | Kenny et al. | |

FOREIGN PATENT DOCUMENTS

| | | | |
|---|---|---|---|
| DE | 112006003032 | B4 | 7/2020 |
| JP | 2002255470 | A | 11/2002 |
| JP | 2006069771 | A | 3/2006 |
| WO | 0001607 | | 1/2000 |

* cited by examiner

HANDRAIL AND METHOD OF MANUFACTURING A HANDRAIL

BACKGROUND

The present invention relates to a handrail for moving walkways, escalators or the like and a method of manufacturing such a handrail.

Handrails made of SBR (styrene-butadiene rubber), CSM (chlorosulfonated polyethylene, e.g. Hypalon), EPDM (ethylene-propylene-diene rubber, EPM (ethylene-propylene rubber) and CPE (chlorinated polyethylene) are known from the prior art. These materials meet the requirements for the ceiling structure of a handrail as they have the necessary resistance. However, these materials are very bulky, which is why they are difficult to assemble. Handrails therefore have to be assembled and fitted manually using solvents and/or adhesives. In other words, such a handrail must be assembled by hand, layer by layer. The manufacturing costs are therefore very high and the increased time required for production has a detrimental effect on manufacturing efficiency. Furthermore, these materials have poor adhesive properties, which is why they have to be applied to a substructure using solvents and adhesives. The use of solvents poses further problems in terms of occupational health and safety and structural measures such as the need for ventilation, protective masks and the like. Furthermore, manual assembly involves the risk of introducing dirt and the resulting loss of adhesion between a ceiling structure and a substructure. There is also a higher susceptibility to errors due to the high proportion of manual work.

The present invention is therefore based on the object of providing a handrail that can be manufactured by machine, is highly resistant and can be produced by machine without the use of solvents.

SUMMARY

According to one aspect of the present invention, there is provided a handrail for moving walkways, escalators or the like which can be mounted on a guide element, wherein the handrail has a substantially constant cross-section along its profile direction. Preferably, the handrail comprises a substructure which is arranged or can be arranged on the guide element. Preferably, the handrail comprises a ceiling structure which has at least one adhesive layer and a top layer, wherein the materials of the top layer and the adhesive layer preferably differ. In particular, the ceiling structure can be attached to the substructure by means of the adhesive layer.

In contrast to the known prior art, the ceiling structure in the present embodiment can be made of at least two different materials. The top layer of the ceiling structure, which is exposed to the environment, can be formed from a very resistant material in order to give the handrail a high resistance to environmental influences. The adhesive layer, on the other hand, can be used to bond the top layer (or the ceiling structure) and the substructure together. In other words, since the top layer is difficult to bond to other materials of the substructure and often requires adhesion promoters (e.g. solvents and/or adhesives) and a lot of manual labor, the present invention provides an adhesive layer that can bond the top layer to the substructure without adhesion promoters and without an excess of manual labor. The top layer and the adhesive layer can be connected to each other with a material bond by a manufacturing process (e.g. coextrusion process) of the ceiling structure. This can significantly increase the efficiency of the manufacturing process of a handrail. The ceiling structure can therefore be a multi-layer ceiling structure.

The top layer and the adhesive layer can, for example, be connected to each other with a material bond by a manufacturing process (for example by extrusion, pressing, vulcanization, calendering, etc.), whereas the adhesive layer can be attached/connected to/with the substructure in a different way. In other words, the top layer can be a two-layer element. Furthermore, the top layer can be connected with a material bond to the adhesive layer and a textile with a reinforcement/coating. The adhesive layer can have a material that matches the substructure so that a connection is easily possible. For this purpose, the adhesive layer and the substructure can comprise materials that are inert to each other, i.e. do not chemically influence each other. This can be achieved in particular by the substructure and the adhesive layer comprising the same materials or mutually friendly or compatible materials. Consequently, an advantageous connection between the ceiling structure and the substructure can be provided. Therefore, an assembly of the ceiling structure and the substructure can be realized by machine, whereby manufacturing efficiency can be increased. Furthermore, the use of adhesion promoters is not necessary, which can reduce the workload of the work personnel. The ceiling structure can be a separately manufactured semi-finished product which, after completion, can be attached to a substructure that is also manufactured as a semi-finished product. In other words, the ceiling structure can be mounted or mountable on the substructure. This increases variability in the manufacture of the handrail, as the substructure and the ceiling structure can be manufactured independently of each other (for example at different locations). The individual layers discussed here (e.g. top layer, volume layer, substructure) can form a volume layer, i.e. a layer with an extension in all three spatial directions. The ceiling structure can be a separately manufactured element. Once the ceiling structure has been provided, it can be connected to the substructure. Due to the adhesive layer on the ceiling structure, subsequent bonding of the ceiling structure to the substructure is also possible easily and efficiently. In particular, this can enable machine assembly.

The ceiling structure is preferably arranged on the substructure and connected to it in such a way that the ceiling structure cannot shift relative to the substructure. Furthermore, the ceiling structure (in particular the top layer) can at least partially surround or cover the substructure and be exposed to the environment, thus protecting the substructure from environmental influences. For example, the ceiling structure consists of only two layers, namely the adhesive layer and the top layer. The adhesive layer can have a sticky or adhesive property so that it can be easily attached to the substructure. Due to the two different materials of the ceiling structure, the variability in the production and planning of the handrail can be increased. For example, the top layer can be selected according to where the handrail is to be used and which environmental influences it is to withstand, i.e. based on the environmental parameters, such as flame resistance, efflorescence-free compositions, ozone resistance, UV resistance and/or temperature resistance. In contrast, the adhesive layer can be selected so that the ceiling structure can be fixed to the suitable substructure with sufficient adhesive strength without the use of solvents.

The guide element on which the handrail is mounted or can be mounted can, for example, be a guide rail or a guide rail system, which the handrail at least partially embraces. The handrail can move relative to the guide element in the direction of the profile. An escalator or moving walkway on which the handrail is provided can have a drive so that the handrail can be moved relative to the guide element in the profile direction. For this purpose, the escalator or moving walkway can have deflection rollers and/or drive rollers that urge the handrail in a certain direction and/or shape. It can therefore be advantageous for the handrail to have a ceiling structure and a substructure that are sufficiently firmly connected to each other so that they do not become detached from each other when the handrail is in operation.

In this case, an essentially constant cross-section—particularly in the profile direction—can mean that the dimensions of a cross-section remain essentially the same compared to another cross-section. Changes in dimensions may be within the range of manufacturing tolerances, while still providing a substantially constant cross-section. In other words, a change in dimensions from one cross-section to the next can be a maximum of 5%.

The substructure can be an element that is designed to slide on the guide element and/or hold the handrail on the guide element. Furthermore, the substructure can provide the handrail with stability against unintentional deformation. For this purpose, the substructure can be designed as a carcass, which can have at least one reinforcing element. For example, the substructure can have a fabric structure, fibers and/or tensile elements running transversely and/or longitudinally to the profile direction. Preferably, the substructure comprises at least one substructure layer (e.g. a volume layer). The substructure layer may comprise at least one of the reinforcing elements. For example, the tension elements can be arranged (e.g. embedded) in the substructure layer. The substructure can comprise two to four layers. This ensures that the substructure is sufficiently light on the one hand and sufficiently strong on the other. The substructure can be provided in a raw state. Alternatively, the substructure can also be provided in a vulcanized state. Once the substructure has been provided, the ceiling structure can be placed on top of it. Furthermore, the substructure can have a sliding layer that is designed to come into contact with the guide element.

This means that the substructure does not have to meet the same high standards of resistance to environmental influences as the top layer, but can be made from a less expensive material. The overall manufacturing costs of the handrail can therefore be reduced. Furthermore, the top layer can have a constant material thickness (i.e. a thickness in a direction transverse to the profile direction and in cross-section). A desired structural thickness can be provided by varying the material thickness of the adhesive layer. On the one hand, this simplifies the production of the top layer (as only a constant thickness needs to be produced here) and, on the other hand, achieves a further reduction in costs.

Preferably, the top layer comprises CSM (chlorosulfonated polyethylene) and the adhesive layer SBR (styrene-butadiene rubber). In this case, the advantages of both materials can optimally complement each other to provide a highly efficient ceiling structure. More specifically, CSM offers sufficient resistance to environmental influences, whereas SBR is a cost-effective material, so that the material costs of the ceiling structure can be reduced. Furthermore, the adhesive layer with SBR can be easily applied to the substructure without the need for an adhesion promoter, which further simplifies production. The top layer and the adhesive layer can be bonded together by material bonding.

Preferably, the top layer comprises EPDM (ethylene propylene diene rubber), TPE (thermoplastic elastomers), EPM (ethylene propylene rubber), CPE (chlorinated polyethylene), CSM (chlorosulfonated polyethylene), Hypalon, PU (polyurethane), SBR (styrene butadiene rubber), NBR (acrylonitrile butadiene rubber) and/or NR (natural rubber). The above materials can be an indication of the base polymer, which can be extended by further additives. In this way, different properties such as different elasticities and/or resistances can be produced. For example, carbon black can be used as an additive. In this way, the demanding properties of the top layer in terms of resistance to ozone, UV and/or temperature can be provided, while at the same time a flame-resistant top layer is achieved. Due to the presence of the adhesive layer, it is not necessary to pay attention to any incompatibilities of the materials with the substructure in the top layer. This increases the degree of freedom in the planning and execution of the top layer.

Preferably, the adhesive layer comprises EPDM (ethylene propylene diene rubber), TPE (thermoplastic elastomers), EPM (ethylene propylene rubber), CPE (chlorinated polyethylene), CSM (chlorosulfonated polyethylene), Hypalon, PU (polyurethane), SBR (styrene-butadiene rubber), NBR (acrylonitrile-butadiene rubber), NR (natural rubber) CR (chloroprene rubber). The above materials can be an indication of the base polymer, which can be extended by further additives. In particular, SBR and/or CR are/is a relatively inexpensive material (compared to the materials of the top layer) and has an adhesive or bonding property so that the adhesive layer can be easily fixed to a substructure (e.g. a carcass). This means that no adhesion promoter, in particular no solvent, is required to attach the ceiling structure with the adhesive layer to the substructure. This makes it easier to process the two semi-finished products. Furthermore, the adhesive layer can be provided in such a way that it can compensate for unevenness in the substructure so that a flat surface of the handrail is guaranteed (with a constant material thickness of the top layer). For example, the substructure can comprise a tension element made of steel strips, which are only provided in a central area (further details below), so that the substructure has a variable material thickness in the cross-section, which can be compensated for by the adhesive layer, for example. This allows the top layer to have a flat surface, especially in a vulcanized state. A flat surface is advantageously grippable by a user, which is why the handrail can give the user a good grip. Preferably, the adhesive layer is the only layer used to compensate for unevenness Preferably, the handrail has two, in particular curved, edge areas in a cross-section transverse to the profile direction and a central area connecting the edge areas. The central area can be flat. In other words, the central area can have no curvature. The central area can therefore be easier to manufacture. Furthermore, the central area can be designed in such a way that the top layer, the adhesive layer and the substructure in the central area have a constant material thickness. In contrast, the material thickness, in particular of the substructure, can be reduced in the two edge areas. Preferably, the material thickness of at least one layer in each of the edge areas decreases in the first third of an overall extension of the respective edge area, starting from a connection point between the central area and the edge area. It was found that a reduced bending force is thus required to guide the handrail on the guide element and/or guide rollers. The energy required to drive the handrail can therefore be reduced. By reducing the material thickness, it is possible to use the material more efficiently while still achieving a high resistance of the handrail. Furthermore, the handrail remains flexible so that it can be driven with low energy requirements. Preferably, the edge areas are symmetrical in relation to an axis that runs through the center of gravity of the handrail profile. Furthermore, the edge areas can have a curved shape in cross-section transverse to the profile direction. More specifically, the edge areas can be designed so that they partially wrap around the guide element in order to hold the handrail on the guide element. In addition to the possibility of mounting the handrail with the curved edge areas on the guide element, the curved edge areas can prevent a user from getting their fingers between the guide element and the handrail. Injuries to a user can therefore be avoided. In particular, the edge areas can be curved in such a way that the handrail has an essentially C-shaped cross-section.

Preferably, the adhesive layer has a constant material thickness. In other words, the thickness of the adhesive layer can be constant across the edge areas and the central area. This can make the adhesive layer easier to manufacture. Overall, the manufacture of the handrail can therefore be simplified.

Preferably, the adhesive layer has a greater material thickness in the central area than in the edge areas. This means that the required thickness of the handrail can be achieved cost-effectively, as the adhesive layer can be made of inexpensive materials compared to the material of the top layer and/or the substructure. Furthermore, the adhesive layer can have a lower bending resistance compared to the top layer. This can prevent the deflection properties of the entire handrail from being significantly negatively affected by an adhesive layer with a higher material thickness. In the edge areas, the adhesive layer can have a reduced material thickness, which is sufficient to secure the ceiling structure to the substructure. As the edge areas have an increased resistance to deflection of the handrail due to their curved shape, it is advantageous to keep the material thickness of the adhesive layer in the area of the edge areas low. Preferably, the substructure has a greater material thickness in the central area than in the edge areas.

Preferably, the top layer has an essentially constant material thickness in the central area and in the edge areas. Essentially can mean that a material thickness can be constant in the areas of the manufacturing tolerance. In other words, a deviation of up to 11% can still be within the manufacturing tolerance. The top layer can therefore be produced particularly easily, as only a constant volume layer needs to be produced. For example, a coextrusion process is a suitable manufacturing method. The top layer can be extruded three or more times to form a semi-finished product. Preferably, the adhesive layer is produced in a coextrusion process together with the top layer in a single step. This makes it possible to create a material bond between the top layer and the adhesive layer. The top layer can be just thin enough to provide the desired resistance to environmental influences and cover the adhesive layer. This can ensure that the bending resistance of the handrail is kept to a minimum and that the handrail can therefore be operated efficiently. Furthermore, co-extrusion of the ceiling structure can improve the lip stiffness of the entire handrail. A high lip stiffness of the handrail ensures a good hold of the handrail on the guide element. In other words, a handrail with a high lip stiffness requires a large force to pull the handrail off the guide element orthogonally to the profile direction.

Preferably, a ratio of the material thickness of the ceiling structure in the central area to the width of the handrail transverse to the profile direction of the handrail is in a range from 0.0012 to 0.08, preferably from 0.01 to 0.065. It has been found that in these ranges a particularly low resistance to deflection of the handrail is achieved, whereby the energy efficiency in an operation of the handrail may be increased.

More specifically, the handrail is bent several times during operation, for example to follow the shape of an escalator, so that more efficient operation (i.e. driving the handrail) can be achieved by reducing the resistance to deflection. At the same time, however, the handrail has sufficient stability to ensure that it is not detached from the guide element even in the event of forces acting transverse to the profile direction. Particularly when using rigid materials in the top layer, there is a risk that the bending resistance of the handrail will increase, resulting in reduced energy efficiency and service life when the handrail is in use. In the area defined above, it was found that both the energy efficiency during operation of the handrail and the resistance of the handrail to environmental influences are advantageously increased.

Preferably, the ratio of the material thickness of the substructure to the material thickness of the top layer in the central area is in a range from 1.25 to 50, preferably from 2.5 to 16. The range from 1.25 to 50 is based on the realization that the substructure is mainly responsible for ensuring the structural stability, in particular the tensile stability, of the entire handrail. In particular, the top layer is mainly intended as a resistance layer against environmental stresses (such as ozone, UV and temperature) and can also provide a flame-resistant barrier. In the range of 1.25 to 50, a handrail is provided where an optimal balance of reduced resistance to deflection and sufficient stability is provided. This ensures efficient operation of the handrail on the one hand and reliable guidance of the handrail by the guide element on the other. Furthermore, the handrail can have increased resistance to external environmental influences. In contrast, the range from 2.5 to 16 has the advantage that the ductility of the handrail is minimized, which means that plastic elongation of the handrail can be avoided. An elongation of the handrail can lead to inaccurate guidance of the handrail on the guide element and to the fact that a driving force can no longer be optimally transmitted to the handrail. By avoiding or reducing the elongation of the handrail, a particularly durable handrail can be provided.

Preferably, the adhesive layer is designed to connect the ceiling structure to the substructure in such a way that an adhesive force of at least 3 $N/mm^2$, preferably at least 6 $N/mm^2$ is achieved. Preferably, the adhesive layer and the substructure have an adhesive force (adhesion force or adhesive strength) of at least 3 $N/mm^2$, preferably at least 6 $N/mm^2$. The adhesive force can be defined as peel adhesion or peel force, which indicates the force required to peel one layer of material from another layer of material, whether flexible, smooth or rigid. This peel force is always and only measured across the width of the bonding surface, so that a higher release force is required. Preferably, the peel force can be determined in accordance with DIN EN ISO 22970: 2021-04. In particular, the adhesive layer can have such stickiness (e.g. chemical bonding property) that the adhesive force is achieved. In addition, the adhesive layer and/or the side of the substructure that is in contact with the adhesive layer can be structured in such a way that a mechanical bond (by increasing the surface roughness) is achieved in addition to a chemical bond (tackiness). An adhesive force of 3 $N/mm^2$ is particularly preferable for relatively flat handrails, such as for moving walkways, which hardly overcome any difference in height. An adhesive force of at least 6 $N/mm^2$ is advantageous for escalators that overcome a large difference in height and therefore require a handrail that is bent several times during a circuit. The durability of the handrail (i.e. the connection between the ceiling structure and the substructure) can only be guaranteed with a correspondingly high adhesive force.

Preferably, the ceiling structure is a coextruded product. Accordingly, the ceiling structure can be coextruded as a semi-finished product separately from the substructure. The top layer and the adhesive layer can bond with each other during the coextrusion process due to their flowable aggregate state. This means that materials in the top layer and the adhesive layer can also be bonded together, which can otherwise only be bonded using solvents or other adhesion promoters. The advantage of the present invention is therefore that no adhesion promoter is required to bond the top layer to the adhesive layer. Consequently, the assembly of the ceiling structure can be carried out by machine, which can increase the accuracy of the assembly. Furthermore, mechanical assembly can prevent impurities, dirt or grime from being introduced into the ceiling structure. Consequently, a higher stability of the handrail can be provided. Another advantage of a coextruded product is that the material is distributed particularly homogeneously, which ensures a high durability of the ceiling structure. The ceiling structure can also be extruded in two, three or more steps, as long as a material bond is achieved between the adhesive layer and the top layer. This means that even more complex ceiling structures can be produced by machine without the use of adhesion promoters.

Preferably, the ceiling structure has at least one further layer, which preferably comprises the same material as the substructure. This allows the top layer to be adapted to further requirements of the handrail. For example, a damping property of the handrail can be provided by an additional layer. The additional layer can, for example, be extruded onto the already created ceiling structure using an additional extrusion layer. Furthermore, the additional layer can also be extruded in the coextrusion process at the same time as the top layer and the adhesive layer. As the additional layer preferably comprises the same material as the substructure, the additional layer can also be easily attached to the substructure. This ensures optimum adhesion of the ceiling structure to the substructure. Alternatively, a further layer or further layers can be applied to the ceiling structure by calendaring. In this way, for example, desired material thicknesses and/or other properties of the handrail can be efficiently and easily implemented in the production line of the handrail. Furthermore, it is not necessary to adapt the production of the substructure, as the ceiling structure can be equipped with additional layers to achieve the desired properties. It is therefore not necessary to adapt the substructure, it is sufficient to adapt the ceiling structure. Consequently, the manufacturing process of the handrail can be simplified.

Preferably, the substructure has a tension element that extends along the profile direction of the handrail. Preferably, the substructure has the task of ensuring the structural stability of the handrail. In particular, the substructure has the task of providing the tensile strength of the handrail. For this purpose, the substructure can comprise at least one tensile element, for example a steel cable, a fabric layer, a cord band or the like, which extends along the profile direction. In other words, the tension element can extend along the direction of movement of the handrail. Preferably, the tension element is only arranged in the central area, so that the substructure has a greater material thickness in the central area than in the edge areas. The tension element can be designed to absorb a tensile force. The tension element can therefore be responsible for ensuring that any change in length of the handrail remains within narrow limits. As a result, reliable operation of the handrail can be ensured over a long period of time.

According to a further aspect of the present invention, there is provided a method of manufacturing a handrail mountable on a guide element for moving walkways, escalators or the like, the method comprising the steps of: coextruding a ceiling structure comprising at least an adhesive layer and a top layer, wherein the materials of the top layer and the adhesive layer are different, and attaching the ceiling structure with the adhesive layer to a substructure. In other words, the ceiling structure, consisting of the top layer and the adhesive layer, and the substructure are provided as two separately produced semi-finished products and subsequently joined together. This means that the adhesive layer can be matched to the substructure, making it easy to attach the ceiling structure with the adhesive layer to the substructure without the need for an adhesion promoter (e.g. solvent). This simplifies the production of the handrail and can be carried out by machine, for example.

Preferably, the method comprises the further following step: applying a first further layer to the ceiling structure, in particular by calendering, wherein the at least one further layer preferably comprises the same material as the substructure.

Preferably, several ceiling structures can be extruded separately and joined together after extrusion. This makes it possible to achieve a ceiling structure with the desired properties and a specific dimension by simply adding further layers without having to change the manufacturing process.

Preferably, the method further comprises the following step: vulcanizing the substructure, or vulcanizing the substructure with the ceiling structure attached thereto. In other words, the handrail comprising the ceiling structure and the substructure can be vulcanized as a whole, whereby a firm cohesion of the ceiling structure and the substructure can be achieved. Alternatively, the substructure can be vulcanized before the ceiling structure is attached, which can save energy during vulcanization, as the mould for vulcanization does not also have to accommodate the ceiling structure. Consequently, a particularly energy-efficient manufacturing process can be provided.

BRIEF DESCRIPTION OF THE DRAWINGS

The advantages and features that have been presented in connection with the device also apply analogously to the method and vice versa. Individual features and associated advantages can be combined with each other to form new embodiments.

In the following, preferred embodiments of the present invention are described in detail with reference to the figures. It shows.

DETAILED DESCRIPTION OF THE PREFERRED EMBODIMENTS

Figure 1:
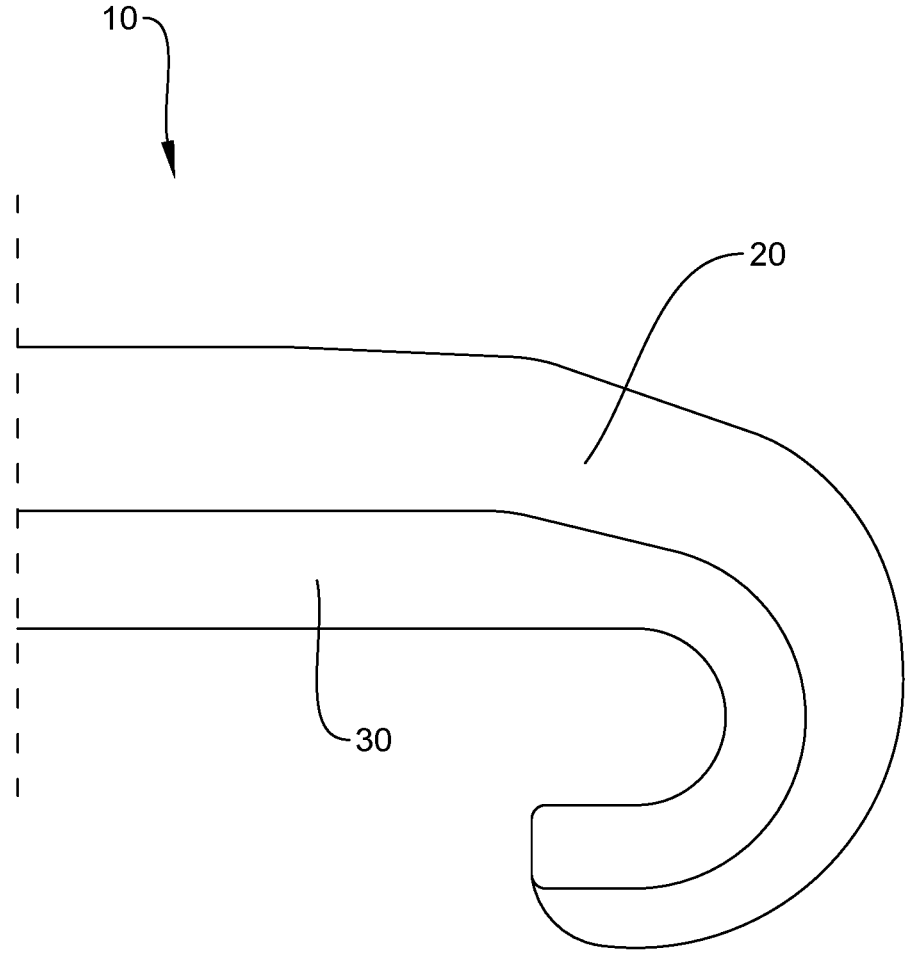
FIG. 1 is a cross-section through a handrail as known from the prior art.

FIG. 1 is a schematic view of a cross-section of a handrail 10 as known from the prior art. Only one side of the handrail 10 is shown in FIG. 1. The side of the handrail 10 not shown is symmetrical to the part of the handrail 10 shown with respect to the axis of symmetry shown. The handrail 10 comprises a top layer 20 and a substructure 30. The top layer 20 is integrally formed from a material which has the desired properties for the intended place of use of the handrail 10. The substructure 30 ensures the structural strength of the handrail 10. The top layer 20 is attached to the substructure 30 by means of manual assembly. In this process, layer by layer of the top layer 20 is built up on the substructure 30 using an adhesion promoter.

This has the disadvantage that the use of solvents means that employees who carry out the manual assembly are exposed to an increased level of pollutants. Furthermore, manual assembly is less efficient and there is a risk that dirt will be introduced, which can result in insufficient adhesion of the top layer 20 to the substructure 30.

Figure 2:
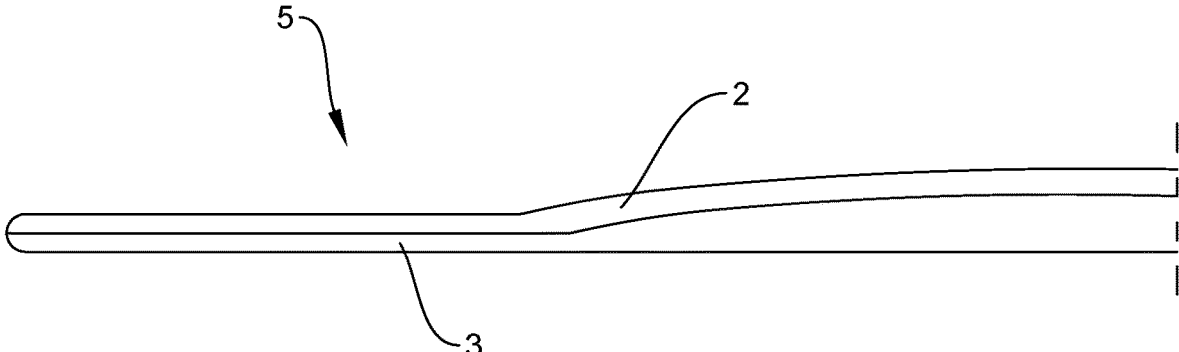
FIG. 2 is a schematic cross-section of a ceiling structure according to one embodiment of the present invention.

Taking this into account, the present invention proposes a ceiling structure 5 comprising at least one top layer 2 and an adhesive layer 3. FIG. 2 is a schematic view of the ceiling structure 5 according to one embodiment of the present invention. Only a section of the ceiling structure 5 is shown in FIG. 2. The materials of the adhesive layer 3 and the top layer 2 differ. In the present embodiment, the top layer 2 has a constant material thickness. In contrast, the adhesive layer 3 has a varying material thickness. This means that the adhesive layer 3 can be used to even out any unevenness (such as that caused by an uneven substructure) at low cost. This saves material in the top layer 2, which means that the ceiling structure 5 can be produced more cost-effectively overall.

Figure 3:
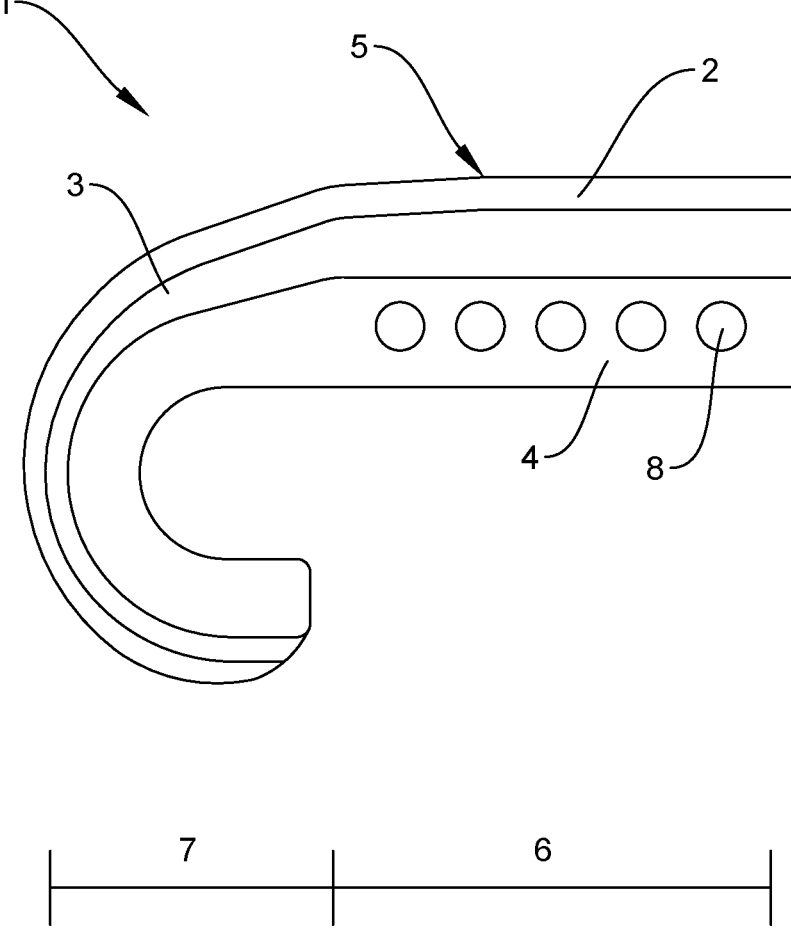
FIG. 3 is a cross-section through a handrail according to an embodiment of the present invention.

FIG. 3 is a schematic cross-sectional view of a handrail 1 according to one embodiment of the present invention. The handrail 1 in FIG. 3 is shown in a cross-section transverse to the profile direction in sections. The profile direction is on the sheet surface of FIG. 3. More precisely, only one side of the axially symmetrical handrail 1 is shown. However, the side not shown is symmetrical to the side of the handrail 1 shown. The handrail 1 comprises a ceiling structure 5 shown in FIG. 2 with the top layer 2 and the adhesive layer 3. The ceiling structure 5 is attached to a substructure 4 with the adhesive layer 3. The material of the adhesive layer 3 is selected in such a way that sufficient adhesiveness is achieved so that the ceiling structure 5 can be advantageously attached to the substructure 4 without the use of an adhesion promoter. In the present embodiment, the adhesive layer comprises chloroprene rubber (CR), so that the adhesive layer adheres well to the substructure 4. Furthermore, in the present embodiment, the top layer comprises chlorosulfonated polyethylene (CSM), wherein the ceiling structure 5 has been produced by coextrusion. The top layer 2 therefore adheres to the adhesive layer 3 with a material bond. The substructure 4 also comprises a tension element 8 consisting of several steel strips that run along the profile direction. The tension element 8 can absorb tensile forces and ensures a constant length of the handrail 1 over its service life.

In a further embodiment, the top layer in the above ceiling structure 5 comprises ethylene propylene diene rubber (EPDM) or polyurethane (PU). The extrusion process can also be used to combine the materials of the top layer with the adhesive layer. Thanks to the adhesive layer 3, the ceiling structure 5 can be attached to the substructure 4. This means that the attachment of the ceiling structure 5 to the substructure 4 is independent of the material used for the top layer 2.

In the present embodiment, the top layer has a thickness of 0.1 mm to 4 mm, as this area provides sufficient protection against external influences such as ozone, UV and temperature stresses. In the present embodiment, the substructure 4 is approx. 5 mm thick. The adhesive layer has a material thickness of 10 mm minus the material thickness of the substructure 4 minus the material thickness of the top layer. In other words, the adhesive layer 3 compensates for fluctuations in the material thickness of the other layers. Preferably, the top layer 2 is provided with a constant material thickness so that the adhesive layer 3 merely compensates for thickness fluctuations in the substructure 4.

In the present embodiment, the cross-section of the handrail is divided into a central area 6 and two edge areas 7. In the central area 6, the handrail has a greater thickness than in the edge area 7. Furthermore, the edge area 7 is curved in such a way that the cross-section of the edge area 7 forms a C-shape.

The adhesive layer forms a bond with the substructure 4, which has an adhesive strength in the range of 3-10 N/mm$^2$. This ensures sufficient stability of the handrail 1. All layers mentioned in the present invention are volume layers which have an extension in every spatial direction.

LIST OF REFERENCE SYMBOLS

1 Handrail
2 Top layer
3 Adhesive layer
4 Substructure
5 Ceiling structure
6 Central area
7 Edge area
8 Tension element
10 Handrail
20 Top layer
30 Substructure

The invention claimed is:

1. A handrail mountable on a guide element for moving walkways and escalators, comprising:
   a substructure configured to be arranged on the guide element; and
   a ceiling structure which has at least one adhesive layer and one top layer;
   wherein the handrail has a substantially constant cross-section along a profile direction of the handrail;
   wherein materials of the top layer and materials of the adhesive layer differ from one another;
   wherein the ceiling structure with the adhesive layer is attached to the substructure;
   wherein the substructure comprises a tension element extending along the profile direction of the handrail; and
   wherein the ceiling structure comprises a coextrusion product.

2. The handrail according to claim 1, wherein the top layer comprises at least one of EPDM, TPE, EPM, CPE, CSM, PU, SBR, NBR and NR.

3. The handrail according to claim 2, wherein the adhesive layer comprises SBR, EPDM, TPE, EPM, CPE, CSM, PU, NBR, NR and/or CR.

4. The handrail according to claim 3, wherein the adhesive layer has a constant material thickness.

5. The handrail according to claim 1, wherein the handrail has two curved, edge areas in a cross-section transverse to the profile direction and a central area connecting the edge areas.

6. The handrail according to claim 5, wherein the adhesive layer has a greater material thickness in the central area than in the edge areas.

7. The handrail according to claim 5, wherein the substructure has a greater material thickness in the central area than in the edge areas.

8. The handrail according to claim 5, wherein the top layer has a substantially constant material thickness in the central area and in the edge areas.

9. The handrail according to claim 5, wherein a ratio of the material thickness of the ceiling structure in the central area to the width of the handrail transverse to the profile direction of the handrail is in a range from 0.0012 to 0.08.

10. The handrail according to claim 5, wherein a ratio of the material thickness of the substructure to the material thickness of the top layer in the central area is in a range from 1.25 to 50.

11. The handrail according to claim 10, wherein the ratio of the material thickness of the substructure to the material thickness of the top layer in the central area is in a range of from 2.5 to 16.

12. The handrail according to claim 1, wherein the adhesive layer is configured to connect the ceiling structure to the substructure such that an adhesive force of at least 3 N/mm$^2$ is achieved.

13. The handrail according to claim 12, wherein the adhesive force is at least 6 N/mm$^2$.

14. The handrail according to claim 1, wherein the ceiling structure includes at least one further layer which comprises the same material as the substructure.

15. The handrail according to claim 1, wherein the adhesive layer comprises SBR, EPDM, TPE, EPM, CPE, CSM, PU, NBR, NR and/or CR.

16. The handrail according to claim 1, wherein the adhesive layer has a constant material thickness.

17. A method of manufacturing a handrail mountable on a guide element for moving walkways and escalators, comprising:

coextruding a ceiling structure comprising at least an adhesive layer and a top layer, wherein materials of the top layer and materials of the adhesive layer differ from one another; and attaching the ceiling structure with the adhesive layer to a substructure, wherein the substructure comprises a tension element extending along the profile direction of the handrail.

\* \* \* \* \*